N. G. WARTH.
MOLD FOR MOLDING RUBBER TUBES.
APPLICATION FILED JAN. 30, 1919.
1,361,208.
Patented Dec. 7, 1920.
2 SHEETS—SHEET 1.
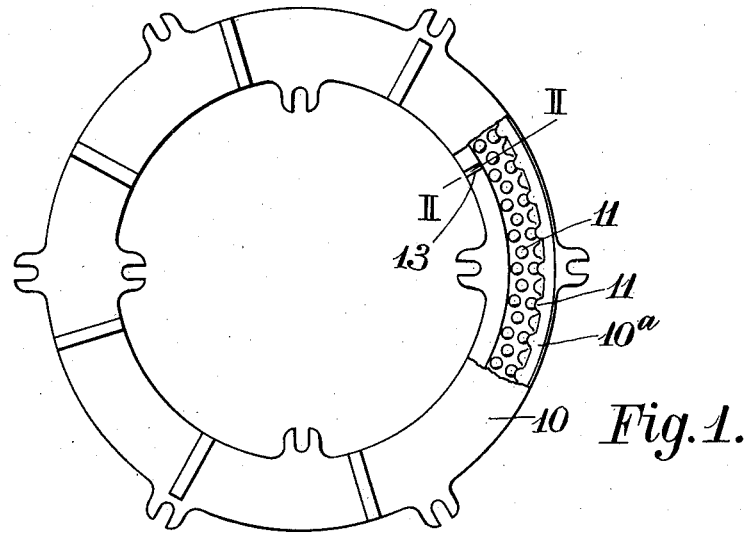
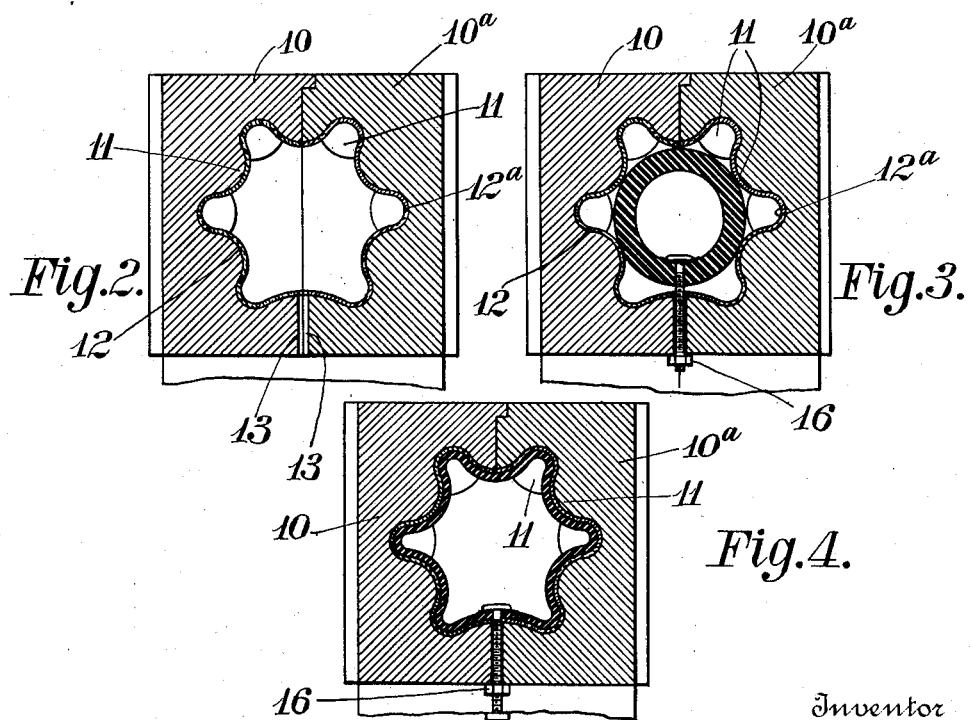
Air pressure supply
Inventor
Nathaniel G. Warth
By Fincael Fincael
his Attorneys Inventor
Nathaniel G. Warth

UNITED STATES PATENT OFFICE.

NATHANIEL G. WARTH, OF COLUMBUS, OHIO, ASSIGNOR TO THE CLIMAX RUBBER COMPANY, OF COLUMBUS, OHIO, A CORPORATION OF OHIO.

MOLD FOR MOLDING RUBBER TUBES.

1,361,208.  Specification of Letters Patent.  Patented Dec. 7, 1920.

Application filed January 30, 1919. Serial No. 273,934.

*To all whom it may concern:*

Be it known that I, NATHANIEL G. WARTH, a citizen of the United States, residing at Columbus, in the county of Franklin and State of Ohio, have invented a certain new and useful Improvement in Molds for Molding Rubber Tubes, of which the following is a specification.

This invention relates to molds for the manufacture of rubber tires and more especially inner tubes for pneumatic tires.

Molds such as now used in the manufacture of rubber tires are first formed of cast metal in the rough and it is necessary to subject them to much machine work to give them their desired form and in cases where designs involving protuberances or recesses from the main surfaces on the tires are to be formed it is necessary also to engrave the mold for these. The time and labor involved in properly putting a rough cast mold blank into condition for use in molding the rubber constitutes a heavy item in the expense of tire production. One of the objects of the present invention therefore is to provide a mold for the manufacture of tires or tubes in which the molding surfaces are substantially completely and directly formed without machining and are given the smoothness of a high polish and adapted to impart to the molded rubber a perfectly finished appearance at small cost.

The invention is embodied in the construction and process hereinafter described and finally claimed.

In the accompanying drawings—

Figure 1 is a plan view of the mold with a portion of one of the sections broken out and omitted to show the interior construction of the complementary section.

Fig. 2 is a cross section on a larger scale on the line II—II Fig. 1.

Fig. 3 is a cross section like Fig. 2 showing the blank tube placed therein.

Fig. 4 is a cross section like Fig. 2 showing the blank tube expanded into vulcanized position.

In the views 10 and 10ᵃ illustrate the mold sections. These are made of cast iron but instead of dressing down and polishing the molding surfaces I coat them including the projections, as at 11, thereon with enamel applied by the usual process of enameling cast iron surfaces as seen at 12 and 12ᵃ. This enamel covers the rough surfaces of the casting and provides a resulting smooth glossy molding surface nicely adapted to impart smooth surfaces to the molded tire. Such molding surfaces also permit the easy removal of the molded tire or tube without injury thereto.

Figure 5:
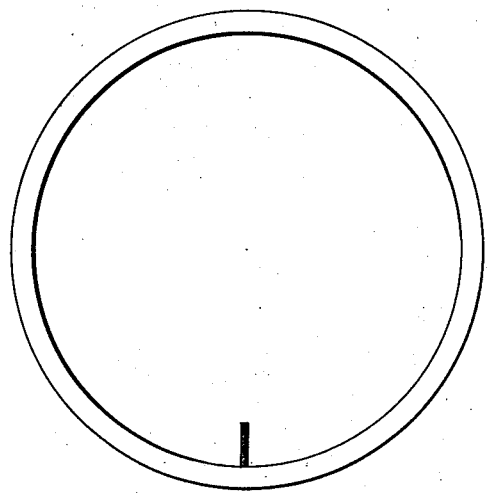
Fig. 5 is a side elevation of the tube blank before molding or in the condition in which it is put into the mold as shown in Fig. 3.
Figure 6:
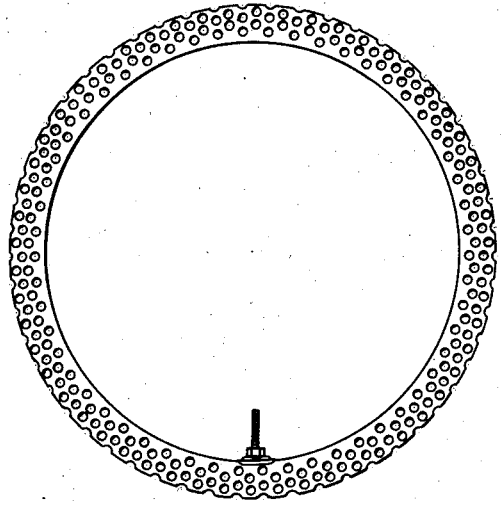
Fig. 6 is a similar view showing the same tube as it comes from the mold after treatment therein as shown in Fig. 4.
Figure 7:
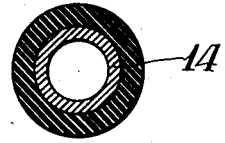
Fig. 7 is a cross section on the same scale as Fig. 3 illustrating how the tube for the tire blank is prepared.

To carry out my process of molding inner tubes in such a mold I provide each of the mold sections at corresponding points with a radial groove as seen at 13, 13, so that when the sections are matched together they form a circular opening to receive the inflating nipple of the blank tube. The blank tube may be first prepared by wrapping a flat sheet of raw rubber of suitable width around a straight mandrel 14 (see Fig. 7) until the desired thickness of blank is obtained and then joining the ends of the tube so formed in any suitable manner to obtain a circular blank with the metallic valve stem or inflating nipple in place therein as shown in Figs. 7 and 3. The blank thus formed is placed in the cavity of the mold sections which are locked together to confine the tube when the air is applied and with the inflating nipple lying in the opening 13 and protruding therefrom as shown in Fig. 3. The tube is then expanded by introducing air under pressure into it through the nipple until the rubber is pressed out and closed against all the molding surfaces as shown in Fig. 4. I have found that about 80 pounds pressure is suitable for properly expanding a tire tube of required thickness of rubber. When the tube is to be molded in the form shown the blank is made of such size and form as to fit as neatly as possible within the cavity of the mold or so that the blank touches or nearly touches the apices of all the projections therein. Such fit insures a more nearly equal distribution of the rubber throughout the cross section of the tube. As the tube is expanded the nut 16 on the nipple is tightened up or a suitable clamp applied to the nipple to hold that portion in place. While the tube is under suitable expanding pressure in the mold it is subjected to the necessary heat to vulcanize the tube in its expanded condition as shown in Fig. 4. That portion of the mold which forms the channel-embracing or inner side of the tube is bulged or curved inward opposite the projections and toward the center line of the mold and is left plain or without the nodules so as to impart a corresponding form to the tube at that region. The effect of this bulge in the mold is to resist undue expansion in that direction and cause an approximately equal distribution of the rubber over all the molding surfaces when the tube is subjected to internal air pressure in forming the same. The form of tube thus produced permits of easy compression laterally for insertion into the usual shoe.

Some deviations from the details herein shown and described can be made without departing from the gist of the invention as claimed.

What I claim is:

1. A mold for molding rubber inner tubes for tires having protuberances around its tread portion and an internal bulge around its rim-forming portion to cause an approximately equal distribution of the rubber over all the molding surfaces when the tube is subjected to internal pressure in forming the same.

2. A mold for molding rubber inner tubes for tires having an internal bulge around its rim-forming portion to form an annular recess at the inner side of the tube.

3. A mold for molding rubber inner tubes for tires having protuberances around its tread portion and an internal bulge around its rim-forming portion to cause an approximately equal distribution of the rubber over all the molding surfaces when the tube is subjected to internal air pressure in forming the same.

NATHANIEL G. WARTH.